(12) United States Patent
Aoki

(10) Patent No.: US 10,082,188 B2
(45) Date of Patent: Sep. 25, 2018

(54) SUSPENSION APPARATUS

(71) Applicant: Showa Corporation, Gyoda (JP)

(72) Inventor: Yasuhiro Aoki, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/466,328

(22) Filed: Mar. 22, 2017

(65) Prior Publication Data

US 2017/0284500 A1    Oct. 5, 2017

(30) Foreign Application Priority Data

Mar. 30, 2016 (JP) .................................. 2016-066974

(51) Int. Cl.
| | |
|---|---|
| *F16F 9/02* | (2006.01) |
| *B60G 11/58* | (2006.01) |
| *F16F 13/00* | (2006.01) |
| *B62K 25/06* | (2006.01) |
| *F16F 9/32* | (2006.01) |

(52) U.S. Cl.
CPC ............ *F16F 13/002* (2013.01); *B60G 11/58* (2013.01); *B62K 25/06* (2013.01); *F16F 9/0236* (2013.01); *F16F 9/3257* (2013.01); *B60G 2300/12* (2013.01); *B60G 2300/122* (2013.01); *B62K 2201/00* (2013.01)

(58) Field of Classification Search
CPC .......... F16F 9/02; F16F 9/0209; F16F 9/0236; F16F 9/0281; F16F 9/3235; F16F 9/3257; F16F 13/002; F16F 13/005; F16F 13/007; B62K 25/06

USPC ............................................ 267/64.17, 64.26
See application file for complete search history.

(56) References Cited

U.S. PATENT DOCUMENTS

| | | | | |
|---|---|---|---|---|
| 1,457,157 | A | * 5/1923 | Galbraith .............. | F16F 9/0209 267/64.11 |
| 4,325,567 | A | * 4/1982 | Hendrickson ........ | B60G 17/044 267/64.17 |
| 4,406,473 | A | 9/1983 | Sexton | |

(Continued)

FOREIGN PATENT DOCUMENTS

| | | |
|---|---|---|
| DE | 102014105624 A | 10/2015 |
| FR | 2271456 A | 12/1975 |

(Continued)

OTHER PUBLICATIONS

Extended European Search Report dated Oct. 10, 2017 for the corresponding European Patent Application No. 17162517.1.

*Primary Examiner* — Thomas J Williams

(74) *Attorney, Agent, or Firm* — Leason Ellis LLP

(57) ABSTRACT

A suspension apparatus includes a first tube and a second tube that are telescopic and that are disposed on a vehicle body side and on a wheel side, respectively; a cylinder that is provided in the first tube; a rod that is provided in the second tube; a piston that is provided on the rod, slidingly contacts with an inner circumferential surface of the cylinder, and forms a first gas chamber on a side of the first tube; a coil spring configured to urge the first tube and the second tube in an extension direction; and a spring receiving member that is disposed at a position on a second tube side from a movable region of the piston, the coil spring being disposed between the spring receiving member and the second tube.

6 Claims, 4 Drawing Sheets

(56) References Cited

U.S. PATENT DOCUMENTS

| | | | | |
|---|---|---|---|---|
| 4,848,524 A | * | 7/1989 | Hosan | A47C 3/30 |
| | | | | 188/322.17 |
| 5,765,804 A | * | 6/1998 | Stumpf | A47C 1/03 |
| | | | | 248/161 |
| 5,775,677 A | * | 7/1998 | Englund | B60G 13/06 |
| | | | | 188/317 |
| 6,371,263 B1 | * | 4/2002 | Hoose | B60G 3/01 |
| | | | | 188/312 |
| 8,827,292 B2 | * | 9/2014 | Batsch | B60G 15/02 |
| | | | | 267/226 |

FOREIGN PATENT DOCUMENTS

| | | |
|---|---|---|
| JP | 2011-225198 A | 11/2011 |
| WO | WO-01/028847 A | 4/2001 |

\* cited by examiner

SUSPENSION APPARATUS

CROSS-REFERENCE TO RELATED APPLICATIONS

The present application claims priority under 35 U.S.C. § 119 to Japanese Patent Application No. 2016-066974, filed Mar. 30, 2016. The contents of this application are incorporated herein by reference in their entirety.

BACKGROUND

Field

The present disclosure relates to a suspension apparatus, and particularly relates to a suspension apparatus capable of making a vehicle more comfortable to ride.

Related Art

Some suspension apparatuses, which connect a vehicle body side and a wheel side, use both an air spring and a coil spring for a suspension spring for elastically supporting a vehicle body.

Japanese Patent Application Laid-open No. 2011-225198 (FIGS. 12 to 14) discloses a suspension apparatus for which a cylinder is arranged inside the paired telescopic tubes, which are disposed respectively on the vehicle body side and on the wheel side, wherein air chambers (air springs) are provided inside the cylinder, the gas chambers being partitioned by a piston, and a coil spring is arranged between a spring receiving member provided around the cylinder and the tube.

SUMMARY

In a technology disclosed by Japanese Patent Application Laid-open No. 2011-225198 (FIGS. 12 to 14), there is a demand for making a vehicle more comfortable to ride.

The present disclosure has been developed in response to the above demand, and an object of the disclosure is to provide a suspension apparatus capable of making the vehicle more comfortable to ride.

In order to attain this object, in a suspension apparatus in a first aspect of the present disclosure, a telescopic first and second tubes are disposed on a vehicle body side and a wheel side, respectively. The first tube is provided with a cylinder, and the second tube is provided with a rod. A piston arranged on the rod slidingly contacts with an inner circumferential surface of the cylinder, whereby a first gas chamber is formed on a side of the first tube. A coil spring urging the first tube and the second tube in an extension direction is located between a spring receiving member and the second tube. The spring receiving member is disposed at a position on the second tube side from a movable region of the piston. Hence, a size of an inner diameter of the cylinder in the movable region of the piston would be less restricted by the coil spring. A pressure in the first gas chamber for obtaining a certain same reaction force is inversely proportional to a cross-sectional area of the cylinder. Accordingly, by disposing the spring receiving member at a position on the second tube side from the piston moveable region so as to make a cross-sectional area of the piston large, the pressure in the first gas chamber for obtaining a certain same reaction force can be decreased. As a sliding resistance between the cylinder and the piston can be decreased by decreasing the pressure in the first gas chamber, it is possible to obtain an advantage of making a vehicle more comfortable to ride.

In the cylinder in a suspension apparatus in a second aspect of the disclosure, a large diameter portion, with which the piston slidingly contacts, is continuous, through a step portion, to a small diameter portion on the second tube side. The small diameter portion is formed with a diameter smaller than a diameter of the large diameter portion, and communicates with a second gas chamber enclosed by the first tube and the second tube. As the spring receiving member is arranged at the step portion, it is possible to obtain an advantage of enabling simplification of a mechanism for fixing the spring receiving member in an axial direction, in addition to the advantage of the first aspect of the disclosure.

In a suspension apparatus in a third aspect of the disclosure, a balance spring receiving member extends inward in a radial direction from the small diameter portion, and a stopper is fixed on an outer circumference of the rod at a position on the piston side from the balance spring receiving member. As a balance spring urges the first tube and the second tube in a compression direction, a reaction force generated by the first gas chamber and the second gas chamber during compression can be decreased. As the balance spring is located between the balance spring receiving member and the stopper, it is possible to prevent the large diameter portion from being damaged due to contact of the balance spring with an inner circumference of the large diameter portion which is the movable region of the piston. Accordingly, in addition to the advantage of the second aspect of the disclosure, it is possible to obtain an advantage of decreasing, by the balance spring, the reaction force generated by the first gas chamber during compression, while preventing the damage of the large diameter portion.

In a suspension apparatus in a fourth aspect of the disclosure, a rebound spring generating a reaction force at a maximum extension of the first tube and the second tube is disposed between the piston and the step portion. Accordingly, in addition to the advantage in the second aspect or the third aspect of the disclosure, it is possible to obtain an advantage of enabling disposition of the rebound spring, using a space between the piston and the step portion.

In a suspension apparatus in a fifth aspect of the disclosure, an expansion chamber is formed in the axial direction inside the rod. As the expansion chamber communicates with the first gas chamber, a volume of the first gas chamber can be enlarged by a volume of the expansion chamber. By enlarging the volume of the first gas chamber, in addition to the advantage of any one of the first to the fourth aspects of the disclosure, it is possible to obtain an advantage of reducing increase in the load in a second half of the compression stroke of the first tube and the second tube.

In a suspension apparatus in a sixth aspect of the disclosure, a sub-tank is provided at a closing member for closing a bottom portion of the second tube. A communication passage communicating with the sub-tank is provided at the closing member. As the expansion chamber penetrates, in the axial direction, through the rod and the communication passage communicates with the expansion chamber, the volume of the first gas chamber can be further increased by a volume of the sub-tank. Accordingly, in addition to the advantage of the fifth aspect of the disclosure, it is possible to obtain an advantage of further reducing the increase of the load in the second half of the compression stroke of the first tube and the second tube.

DETAILED DESCRIPTION OF THE EMBODIMENTS

Figure 1:
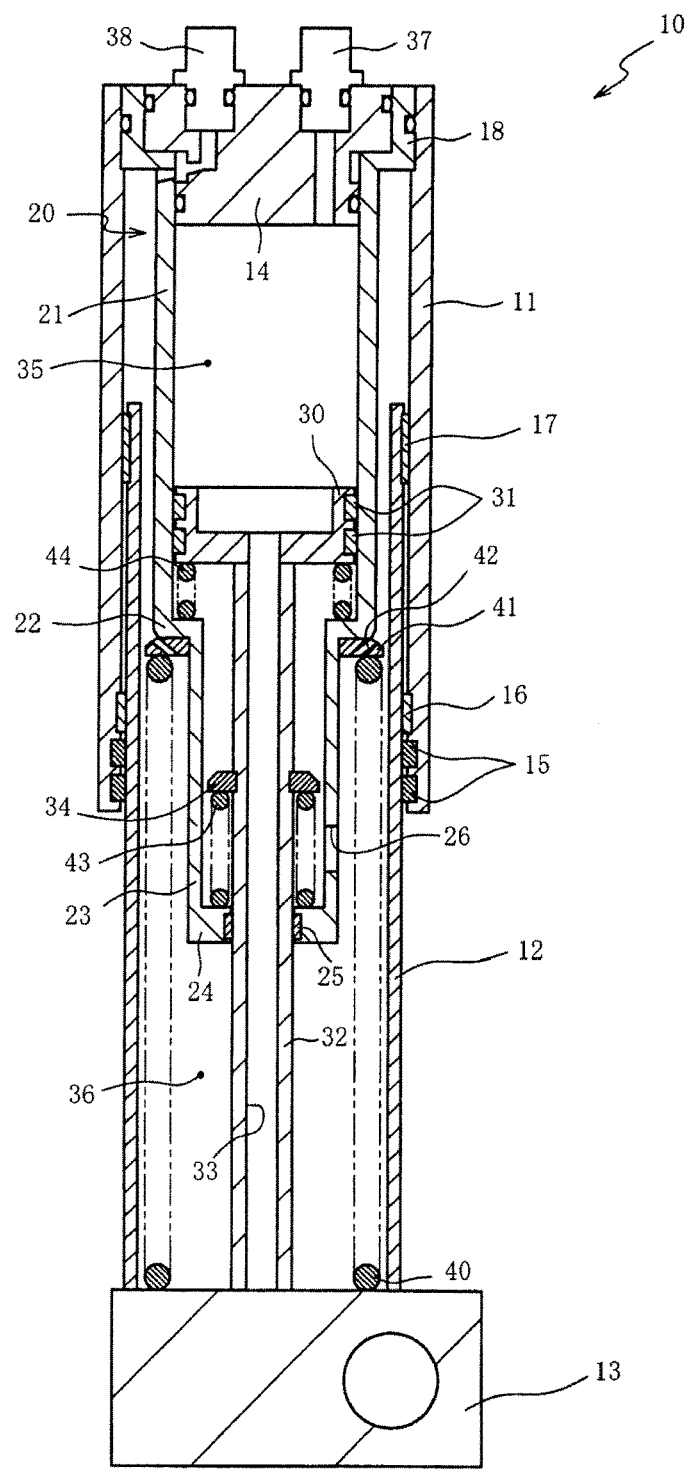
FIG. 1 is a cross-sectional view of a suspension apparatus in a first embodiment.

In the following, preferred embodiments of the present disclosure will be described, referring to attached drawings. First, referring to FIG. 1, a suspension apparatus 10 in a first embodiment of the disclosure will be described. FIG. 1 is a cross-sectional view of the suspension apparatus 10 in an axial direction in the first embodiment. The suspension apparatus 10 is an apparatus attached, in a left-right pair, to both sides of a wheel (not shown) of a straddle-ride vehicle such as a two-wheel vehicle, a three-wheel vehicle, etc. As the suspension apparatus 10 in the present embodiment is not provided with a built-in damper (damping force generator), the suspension apparatus 10 is attached to a side of the wheel in combination with a suspension apparatus (not shown) having the built-in damper.

As shown in FIG. 1, the suspension apparatus 10 is a telescopic type apparatus, in which a second tube 12 moves out of and into a first tube 11, and provided with the first tube 11, which is in a cylindrical shape and connected to a vehicle body side bracket (not shown), and the second tube 12, which is in the cylindrical shape and connected to a wheel side bracket 13. When a shock due to a bump of a road surface is input to the wheel (not shown), the second tube 12 moves out from and into the first tube 11 so that the suspension apparatus 10 extends and compresses. In the present embodiment, a suspension apparatus 10 of an inverted type will be described, in which a second tube 12 on the wheel side moves out of and into the first tube 11 on the vehicle body side, however, it is of course possible to make the suspension apparatus 10 an upright type in which the first tube 11 on the vehicle body side moves out of and into the second tube 12 on the wheel side.

An opening at an upper end of the first tube 11 is closed by a cap member 14, and an opening at a lower end of the second tube 12 is closed by the wheel side bracket 13 (closing member). An annular seal member 15 held on an inner circumference of the lower portion of the first tube 11 slidingly contacts with an outer circumferential surface of the second tube 12. Accordingly, gas and lubricant oil charged into the first tube 11 and the second tube 12 can be prevented from leaking out from a cylindrical gap space formed at a portion where the first tube 11 and the second tube 12 overlap with each other. Sliding movement of the second tube 12 in moving out from and into the first tube 11 is guided by a bush 16 held on the inner circumference at the lower portion of the first tube 11 and a bush 17 held on an outer circumference at an upper portion of the second tube 12.

The first tube 11 holds a cylinder 20 in a state of being hung by the cap member 14 through a holding portion 18. The cylinder 20 has a cylindrical large diameter portion 21, which is located at an upper portion of the cylinder 20, and a cylindrical small diameter portion 23, which is continuous to the large diameter portion 21 through a step portion 22. The step portion 22 is a portion at which the inner surface of the large diameter portion 21 side is perpendicular to a central axis of the first tube 11 and the second tube 12. An outer diameter of the small diameter portion 23 is set smaller than an outer diameter of the large diameter portion 21. An annular rod guide 24, which extends in a radially inward direction, is fixed at a lower end of the small diameter portion 23. The rod guide 24 holds a bush 25 on an inner circumference thereof. The small diameter portion 23 is provided with a communication hole 26 penetrating through the side surface thereof in a radial direction at a lower portion.

A piston 30 is inserted into the large diameter portion 21 of the cylinder 20 so as to be movable in an axial direction. The piston 30 holds an annual seal member 31, on the outer circumference thereof, in slidable contact with an inner circumferential surface of the large diameter portion 21. A first gas chamber 35 formed inside the large diameter portion 21 and a second gas chamber 36 enclosed by the first tube 11 and the second tube 12 are partitioned from each other by the seal member 31 of the piston 30. As lubricant oil is reserved in a lower portion of the second tube 12, the second gas chamber 36 is a space above a liquid surface (not shown) of the lubricant oil reserved in the second tube 12 (excluding the first gas chamber 35).

In the first gas chamber 35 and the second gas chamber 36, compressed gas is charged. A pressure in the first gas chamber 35 is set higher than a pressure in the second gas chamber 36. However, it is of course possible to set, as necessity, the pressure in the second gas chamber 36 to be higher than the pressure in the first gas chamber 35. The second gas chamber 36 communicates with an inside of the small diameter portion 23 through a communication hole 26.

The piston 30 is connected to an upper end of a rod 32 extending in the axial direction. The rod 32 extends along the central axis through a lower portion of the large diameter portion 21 and the small diameter portion 23, protrudes from the rod guide 24, and a lower end thereof is fixed to the wheel side bracket 13. The rod guide 24 and the bush 25 support the rod 32 to be movable in the axial direction. As the rod 32 is provided therein with an expansion chamber 33 formed along the axial direction, a volume of the first gas chamber 35 can be increased by a volume of the expansion chamber 33. In the present embodiment, the expansion chamber 33 penetrates through the rod 32 along the axial direction. A stopper 34 is attached to an outer circumference of the rod 32, on a piston 30 side from the rod guide 24.

The cap member 14 is provided with a first valve 37 and a second valve 38. The first valve 37 is one for supplying and discharging gas to and from the first gas chamber 35. The second valve 38 is one for supplying and discharging gas to and from the second gas chamber 36. Incidentally, needless to say, instead of the first valve 37 and the second valve 38, it is also possible to provide in the cap member 14 rubber membranes that allow sticking the needle of a gas injector through the membranes.

The gases compressed in the first gas chamber 35 and the second gas chamber 36 function as air springs that generate a reaction force corresponding to a compression amount of the first tube 11 and the second tube 12. These air springs always urge the first tube 11 and the second tube 12 in an extension direction to function as a suspension spring for elastically supporting a vehicle body. As the compression amount of the first tube 11 and the second tube 12 is equal to a compression amount of the suspension apparatus 10, and it can also be said that the air springs generate the reaction force corresponding to the compression amount of the suspension apparatus 10, and urge the suspension apparatus 10 in the extension direction. By adjusting the pressures at certain volumes of the first gas chamber 35 and the second gas chamber 36 by supplying and discharging the gases with the first valve 37 and the second valve 38, the air springs by the first gas chamber 35 and the second gas chamber 36 can be set to have desired spring characteristics.

A coil spring 40 is a compression spring that urges the first tube 11 and the second tube 12 in the extension direction, and causes the reaction force corresponding to the compression amount of the suspension apparatus 10. In the present embodiment, the coil spring 40 is made from metal. The coil spring 40 is arranged between a spring receiving member (not shown) provided at the lower portion of the second tube 12 and a spring receiving member 41 provided on a first tube 11 side. As the coil spring 40 is disposed in the second tube 12, friction of the coil spring 40 can be reduced by the lubricant oil (not shown) reserved at the lower portion of the second tube 12.

In addition to the coil spring 40, as air springs by the first gas chamber 35 and the second gas chamber 36 are used, the reaction force in a second half of the stroke of extension and compression of the first tube 11 and the second tube 12 can be increased by a rise of the air springs by the first gas chamber 35 and the second gas chamber 36. The coil spring 40 can supplement the reaction force in a region of a shortfall in the reaction force caused by the air springs (for example, the region from the early stage to the middle stage of the stroke). Just in case the gases in the first gas chamber 35 and the second gas chamber 36 has outgassed, a minimum reaction force is ensured by the coil spring 40.

The spring receiving member 41 is a member provided on an outer circumference of the cylinder 20, and is attached to an outer circumference of the small diameter portion 23 in the present embodiment. The spring receiving member 41 is an annular member, and is provided with a gas hole 42 that extends in a thickness direction (axial direction) and that is formed at a position avoiding a seating surface of the coil spring 40. The step portion 22 restricts a position of the spring receiving member 41 in the axial direction. An inner diameter of the spring receiving member 41 is set to be substantially the same as an outer diameter of the small diameter portion 23. An outer diameter of the spring receiving member 41 is set to be slightly smaller than an inner diameter of the second tube 12. The spring receiving member 41 is arranged at the step portion 22 to be movable and slidable around the small diameter portion 23.

As the spring receiving member 41 has the inner diameter substantially the same as the outer diameter of the small diameter portion 23, the spring receiving member 41 can be put around the small diameter portion 23. Accordingly, the spring receiving member 41 can be easily arranged at the small diameter portion 23. The spring receiving member 41 comes into contact with the step portion 22 and thus is restricted in moving upward so that a mechanism for arranging the spring receiving member 41 with respect to the axial direction of the small diameter portion 23 can be simplified. As the outer diameter of the spring receiving member 41 is slightly smaller than the inner diameter of the second tube 12, scraping of the spring receiving member 41 against the second tube 12 is prevented during the extension and compression of the first tube 11 and the second tube 12. Thus, it is possible to prevent friction between the spring receiving member 41 and the second tube 12, damage on the second tube 12 and the spring receiving member 41, and generation of abrasion powder or abnormal sound. Further, as the gas hole 42 of the spring receiving member 41 can be prevented from being closed by the seating surface of the coil spring 40, it is possible to avoid bad affects by the spring receiving member 41 on smooth compression and expansion of the second gas chamber 36.

A balance spring 43 is a spring that urges the first tube 11 and the second tube 12 in the compression direction, and cancels the reaction force generated by the first gas chamber 35 and the second gas chamber 36 during compression of the first tube 11 and the second tube 12. In the present embodiment, the balance spring 43 is a metal coil spring. The balance spring 43 is disposed between the rod guide 24 provided at the small diameter portion 23 and the stopper 34 provided on the rod 32. The rod guide 24 also has a function to receive the balance spring.

As the balance spring 43 is provided, the reaction force by the compression of the first gas chamber 35 and the second gas chamber 36 is cancelled, and it is thereby possible to reduce a load in the early stage of the stroke of the extension or compression of the first tube 11 and the second tube 12. As the rod guide 24 receives the reaction force, in the axial direction, of the balance spring 43, it is unnecessary to additionally provide a balance spring receiving member that faces the stopper 34 in the axial direction. Accordingly, compared with a case of providing a balance spring receiving member separately from the rod guide 24, an increase in the number of components can be restricted.

The stopper 34 is a member for preventing the balance spring 43 from reaching the movable region of the piston 30 in the large diameter portion 21 when the first tube 11 and the second tube 12 are compressed, and is fixed to the rod 32. As the position of the upper end (on the piston 30 side) of the balance spring 43 is restricted by the stopper 34 fixed to the rod 32, it is possible to prevent the balance spring 43 from coming into contact with the inner circumference of the large diameter portion 21, which is the movable region of the piston 30 when the first tube 11 and the second tube 12 are compressed, and thus from damaging the large diameter portion 21. Around the rod 32, the balance spring 43 is disposed at a position lower than the stopper 34 (on the second tube 12 side), thereby preventing the movable region of the piston 30 from being damaged by the balance spring 43 and preventing sealing by the seal member 31 from being incomplete. Further, compared with a case of disposing the balance spring 43 between the rod guide 24 (balance spring receiving member) and the piston 30, free length of the balance spring 43 can be shortened, and weight of the balance spring 43 can be decreased.

Incidentally, as the communication hole 26 is formed at a lower portion of the small diameter portion 23, lubricant oil (not shown) reserved in the second tube 12 can be introduced from the communication hole 26 into the small diameter portion 23. As the balance spring 43 is disposed at a position of the communication hole 26, friction of the balance spring 43 can be reduced by the lubricant oil having been introduced into the small diameter portion 23.

A rebound spring 44 is disposed between the step portion 22 of the cylinder 20 and the piston 30. The rebound spring 44 is a spring generating a reaction force when the first tube 11 and the second tube 12 are extended to the maximum. In the present embodiment, the rebound spring 44 is a metal coil spring. As the rebound spring 44 is provided, the shock caused at the time of the maximum extension of the first tube 11 and the second tube 12 can be absorbed without affecting spring characteristics when the first tube 11 and the second tube 12 are compressed. As the step portion 22 is formed on the cylinder 20, a space between the piston 30 and the step portion 22 can be effectively used in disposing the rebound spring 44.

As the rebound spring 44 is disposed between the piston 30 and the step portion 22, compared with a case of disposing the rebound spring 44 between a rebound spring receiving member arranged at the small diameter portion 23 and the piston 30, free length of the rebound spring 44 can be shortened. As a result, weight of the rebound spring 44 can be decreased. Further, a position of the rebound spring 44 in the axial direction on the second tube 12 side is restricted by the step portion 22, and a position of the balance spring 43 in the axial direction on the first tube 11 side is restricted by the stopper 34. Accordingly, it is possible that the balance spring 43 and the rebound spring 44 do not overlap with each other in the axial direction. As the portion of overlap between the balance spring 43 and the rebound spring 44 can be made smaller even when the balance spring 43 extends, the balance spring 43 and the rebound spring 44 do not easily interfere with each other.

In the suspension apparatus 10, the spring receiving member 41 for the coil spring 40 is disposed at the step portion 22. As the step portion 22 is located on the second tube 12 side of the large diameter portion 21, which is the movable region of the piston 30, a size of the inner diameter of the large diameter portion 21 would be less restricted by the coil spring 40. Accordingly, within a range not inhibiting relative movement in the axial direction between the large diameter portion 21 and the second tube 12, the outer diameter and the inner diameter of the large diameter portion 21 can be appropriately set, independently of the coil spring 40. The pressure in the first gas chamber 35 for obtaining a certain same reaction force is inversely proportional to an area of the cross-section of the large diameter portion 21 (cylinder 20). Accordingly, by appropriately setting the size of the inner diameter of the large diameter portion 21 independently of the coil spring 40, the pressure in the first gas chamber 35 for obtaining a certain same reaction force can be lowered. As a result, as it is possible to decrease sliding resistance between the cylinder 20 (large diameter portion 21) and the piston 30 (seal member 31), a vehicle can be made more comfortable to ride.

As the suspension apparatus 10 includes the balance spring 43, the reaction force generated by the first gas chamber 35 and the second gas chamber 36 when the first tube 11 and the second tube 12 compress can be cancelled. By the balance spring 43, it is possible to reduce the load in the early stage of the stroke of the extension and compression of the first tube 11 and the second tube 12.

As the small diameter portion 23 housing the balance spring 43 communicates with the second gas chamber 36 through the communication hole 26, it is possible to prevent an inner pressure of the small diameter portion 23 from becoming high when the first tube 11 and the second tube 12 extend to a maximum. Accordingly, it is possible to prevent the sliding resistance of the seal member 31 (particularly on the small diameter portion 23 side) from becoming high at a time when the first tube 11 and the second tube 12 extend to the maximum.

On the suspension apparatus 10, the volume of the first gas chamber 35 can be enlarged by the volume of the expansion chamber 33. If the volume of the first gas chamber 35 is enlarged, it is possible to reduce a change in a rise of the reaction force in the second half of the stroke during when the first gas chamber 35 is compressed. Thus, the vehicle can be made more comfortable to ride.

Figure 2:
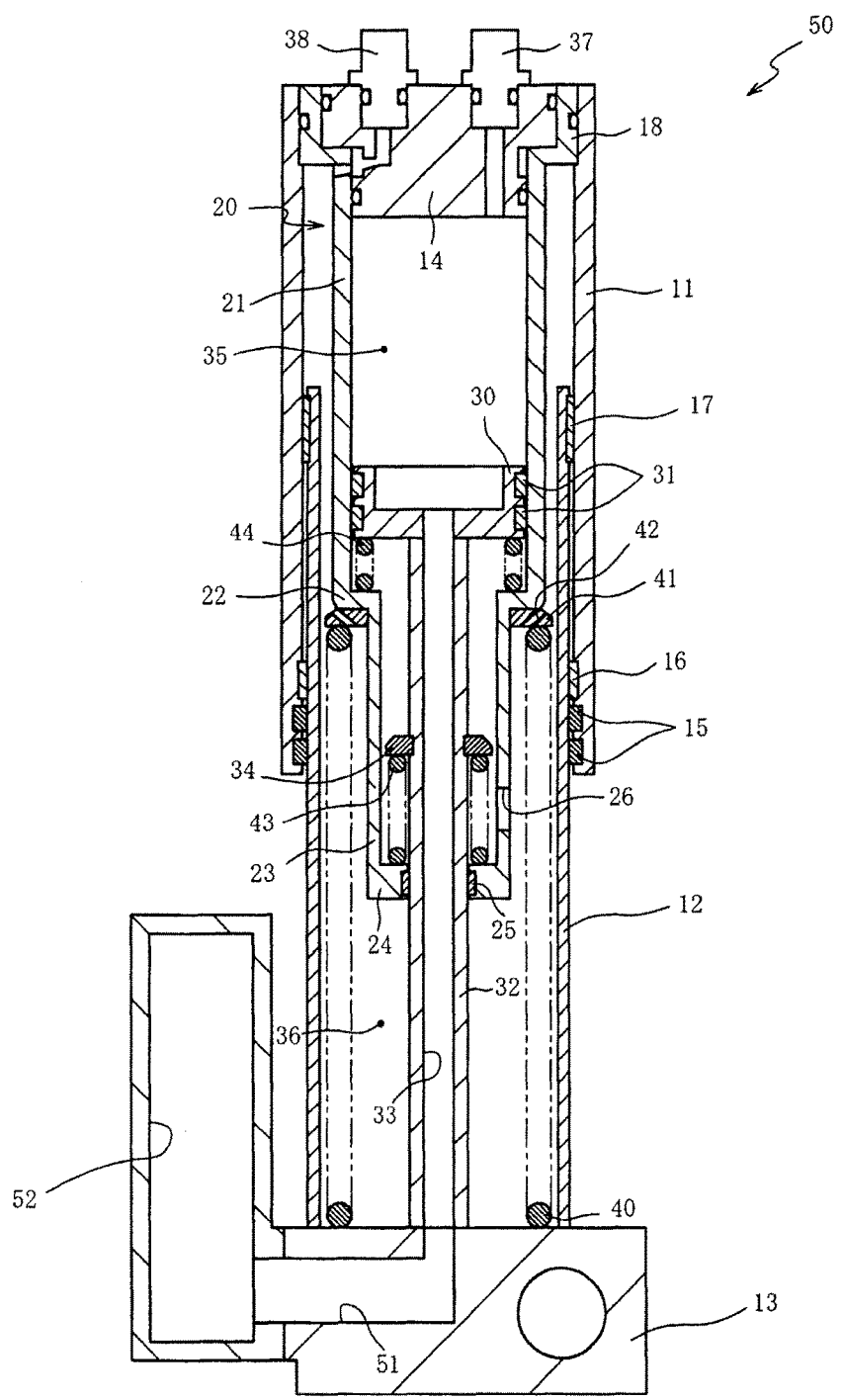
FIG. 2 is a cross-sectional view of a suspension apparatus in a second embodiment.

In the following, referring to FIG. 2, a second embodiment will be described. In description of the first embodiment, the volume of the first gas chamber 35 is enlarged by the expansion chamber 33. Compared with this, in the second embodiment, a case of further enlarging the volume of the first gas chamber 35 will be described. Incidentally, for the same elements as those described in the first embodiment will be given the same reference signs, and description of them will be omitted. FIG. 2 shows a cross-sectional view of a suspension apparatus 50 in the second embodiment.

As shown in FIG. 2, the suspension apparatus 50 is provided with a communication passage 51 and a sub-tank 52 at the wheel side bracket 13 (closing member). The communication passage 51 is a passage communicating with the expansion chamber 33 formed in the rod 32. The sub-tank 52 is attached to the wheel side bracket 13 attachably and detachably, and communicates with the communication passage 51.

Compared with the suspension apparatus 10 described in the first embodiment, as in the suspension apparatus 50, the volume of the first gas chamber 35 can be enlarged by the volume of the communication passage 51 and the sub-tank 52, it is possible to further decrease the change in the rise of the reaction force in the second half of the stroke during when the first gas chamber 35 is compressed. Thus, the vehicle can be made more comfortable to ride.

If the free length of the rebound spring 44 is enlarged, a reaction force during the extension of the first tube 11 and the second tube 12 can be obtained in an early stage. On the other hand, a length, in the axial direction, of the suspension apparatus 50, which elastically supports the vehicle body on the wheel (neither one is shown), is predetermined. Accordingly, as the free length of the rebound spring 44 becomes longer, the axial direction length of the first gas chamber 35 becomes correspondingly shorter. If the inner diameter of the first gas chamber 35 is unchanged, as the volume of the first gas chamber 35 becomes smaller if the axial direction length of the first gas chamber 35 becomes shorter, the rise of the load in the second half of the stroke of the extension and compression of the first tube 11 and the second tube 12 tends to be quicker. In order to prevent this, by the sub-tank 52, the volume of the first gas chamber 35 is enlarged so that change at the rise of the load in the second half of the stroke of the extension and compression of the first tube 11 and the second tube 12 can be reduced.

As the sub-tank 52 is attachable and detachable to and from the wheel side bracket 13, it is possible to replace the sub-tank 52 with another one having a different volume, as appropriate, depending on stiffness of the suspension spring a rider desires. If the sub-tank 52 is unnecessary, the sub-tank 52 is detached from the wheel side bracket 13, and the communication passage 51 is closed with a lid (not shown). However, it is of course possible to fix the sub-tank 52 to the wheel side bracket 13 not to be detachable. Incidentally, as the sub-tank 52 is attached to the wheel side bracket 13, it is possible to arrange the sub-tank 52, using a space around the axle (not shown). Thus, the sub-tank 52 would less bring a feeling of strangeness to a rider.

The sub-tank 52 is partitioned inside by a free piston (not shown), and a third gas chamber (not shown) can be arranged in the sub-tank 52, being partitioned from the first gas chamber 35, the expansion chamber 33, and the communication passage 51. A maximum value of a volume of the third gas chamber is limited by a stopper (not shown) arranged in the sub-tank 52. Gas to be compressed and charged into the third gas chamber is supplied and discharged by a valve (not shown) provided in the sub-tank 52. By making it possible to adjust a pressure in the third gas chamber, the spring characteristics of the air spring can be appropriately set.

Figure 3:
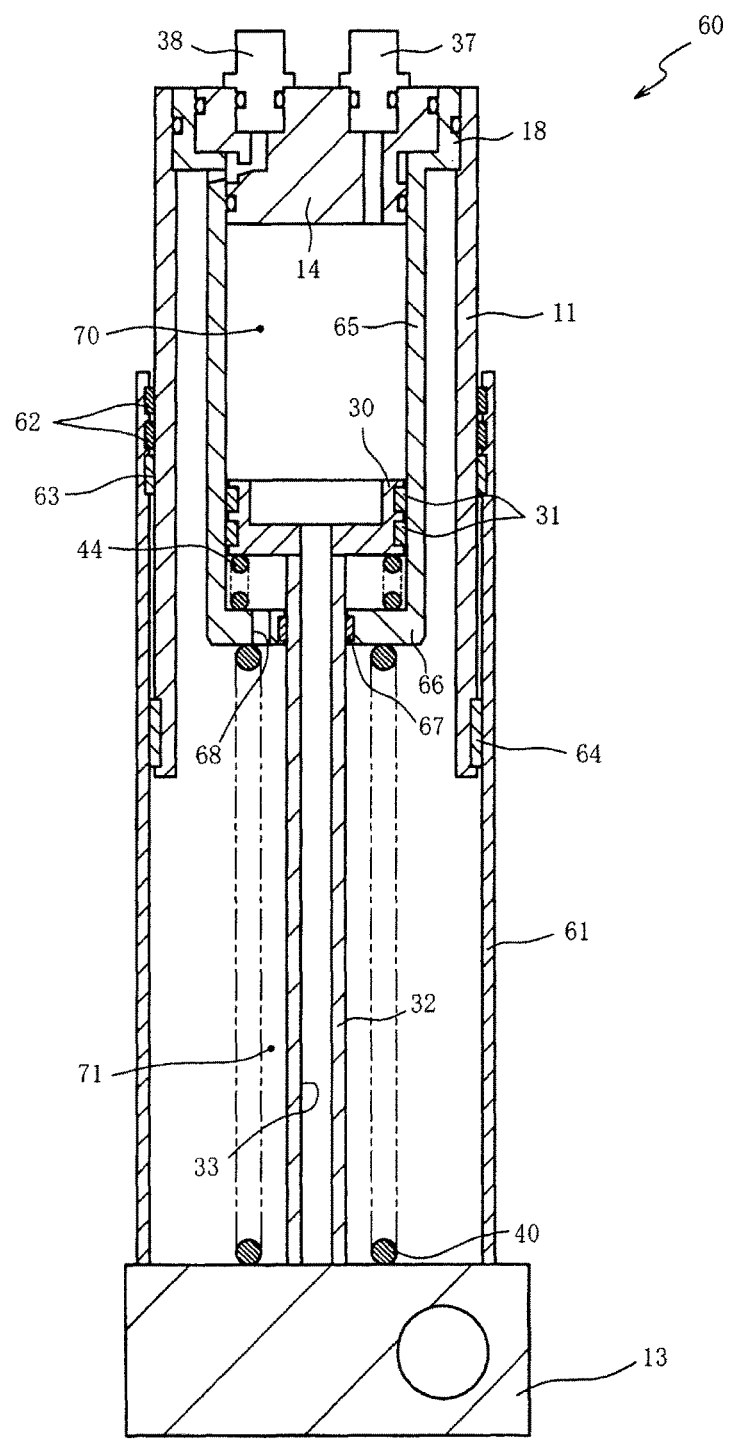
FIG. 3 is a cross-sectional view of a suspension apparatus in a third embodiment.

In the following, referring to FIG. 3, a third embodiment will be described. In description of the first and second embodiments, the spring receiving member 41 is disposed at the cylinder 20. Compared with this, in the third embodiment, a case where a rod guide 66 arranged at a cylinder 65 serves also as a spring receiving member will be described. Incidentally, for the same elements as those described in the first embodiment will be given the same reference signs, and description of them will be omitted. FIG. 3 shows a cross-sectional view of a suspension apparatus 60 in the third embodiment.

As shown in FIG. 3, the suspension apparatus 60 is a telescopic type, in which the first tube 11 moves out from and into a second tube 61. Here, the first tube 11 is connected to the vehicle body side bracket (not shown), and the second tube 61 is cylindrical and is connected to the wheel side bracket 13. In the suspension apparatus 60, when the shock due to the bump of the road surface is input to the wheel (not shown), the first tube 11 moves out from and into the second tube 61 to extend and compress.

The second tube 61 is, at an opening at a lower end thereof, closed by the wheel side bracket 13. As an annular seal member 62 held on an inner circumference at an upper end of the second tube 61 slidably contact with an outer circumferential surface of the first tube 11, it is possible to prevent gas and lubricant oil, which are charged in the first tube 11 and the second tube 61, from leaking out through a cylindrical gap space formed at a portion where the first tube 11 and the second tube 61 overlap with each other. A bush 63 held on an inner circumference at an upper portion of the second tube 61 and a bush 64 held on an outer circumference of a lower portion of the first tube 11 guide the sliding when the first tube 11 moves out from and into the second tube 61.

The first tube 11 holds a cylinder 65 in a state of being hung by the cap member 14 through the holding portion 18. The cylinder 65 forms a first gas chamber 70 by the inserted piston 30. By the seal member 31 for the piston 30, the first gas chamber 70 formed in the cylinder 65, and a second gas chamber 71 enclosed by the first tube 11 and the second tube 61, are partitioned from each other.

The rod guide 66 which is annular and extends inward in a radial direction is fixed to a lower end (on a side opposite to the cap member 14) of the cylinder 65. The rod guide 66 holds a bush 67 on an inner circumference thereof. The rod guide 66 and the bush 67 support the rod 32 to be movable in the axial direction. The rod guide 66 is provided with a communication hole 68 penetrating through the rod guide 66 in the axial direction. The rebound spring 44 is arranged between the rod guide 66 and the piston 30. The rod guide 66 serves also as a rebound spring receiving member. A space on the second tube 61 side of the cylinder 65 where the rebound spring 44 is arranged communicates with the second gas chamber 71 by the communication hole 68.

The coil spring 40 is disposed between a spring receiving member (not shown) provided at a lower portion of the second tube 61 and the rod guide 66. The rod guide 66 serves also as a spring receiving member receiving the coil spring 40. Incidentally, in order to prevent interference between the coil spring 40 and the first tube 11 during the extension and compression of the first tube 11 and the second tube 61, a guide (not shown) for preventing deflection of the coil spring 40 is arranged around the rod 32.

By the suspension apparatus 60 in the third embodiment, without restriction by the spring receiving member (rod guide 66), a size of the inner diameter of the cylinder 65 in the movable region of the piston 30 can be set. Accordingly, operation and advantage similar to those of the suspension apparatus 10 described in the first embodiment can be realized. Further, as the cylinder 65 has a simple cylindrical shape, the cylinder 65 can be easily manufactured.

Figure 4:
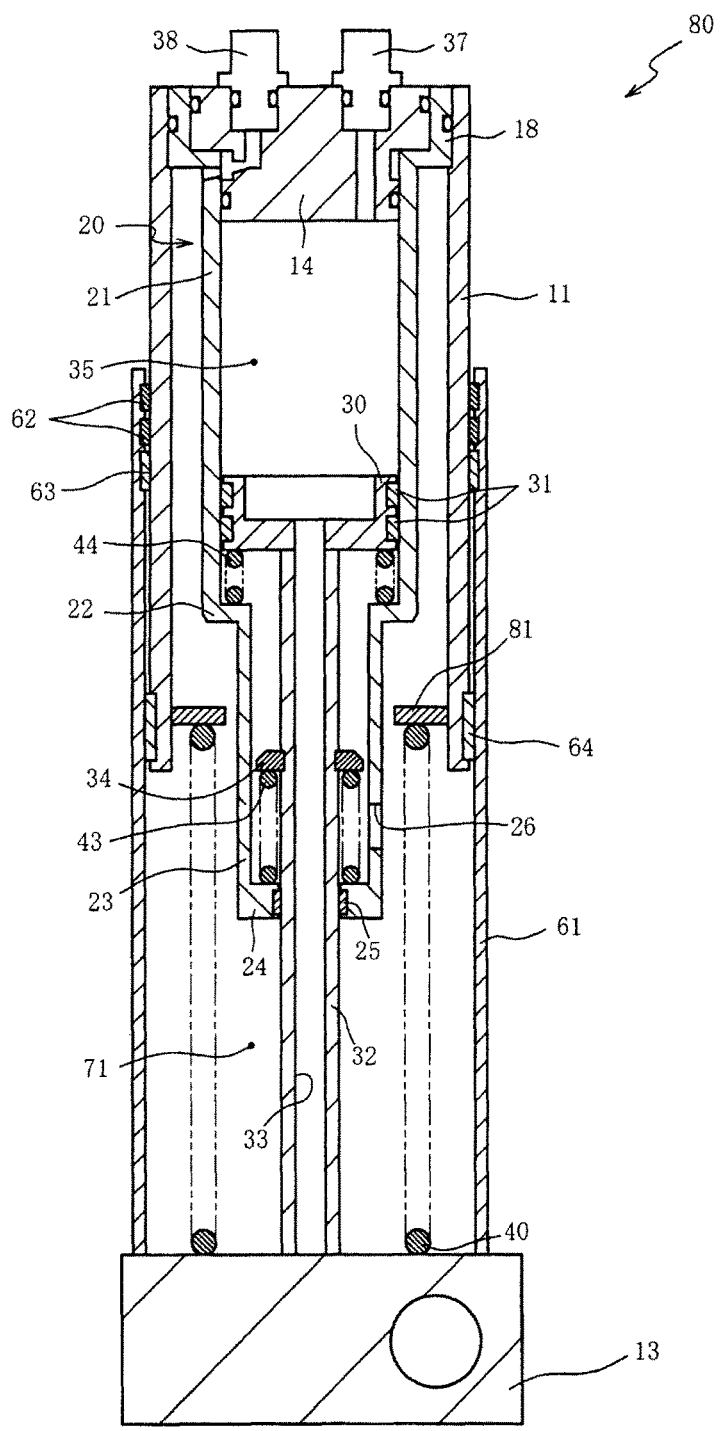
FIG. 4 is a cross-sectional view of a suspension apparatus in a fourth embodiment.

In the following, referring to FIG. 4, a fourth embodiment will be described. In the third embodiment, described was a case where the cylinder 65 is not provided with the large diameter portion 21, the step portion 22, nor the small diameter portion 23. In comparison with this, in the fourth embodiment, described will be a case where the cylinder 20 having the large diameter portion 21, the step portion 22, and the small diameter portion 23 is arranged in the first tube 11. Incidentally, for the same elements as those described in the first and third embodiments will be given the same reference signs, and description of them will be omitted. FIG. 4 shows a cross-sectional view of a suspension apparatus 80 in the fourth embodiment.

As shown in FIG. 4, in the suspension apparatus 80, a spring receiving member 81 is fixed to the first tube 11 at a position on the second tube 61 side from the step portion 22 of the cylinder 20. The spring receiving member 81 is a member for arranging the coil spring 40 between the spring receiving member 81 and a spring receiving member (not shown) provided at the lower portion of the second tube 61. The spring receiving member 81 is fixed to the first tube 11 by known means such as screw-in or the like. Incidentally, in order to prevent interference between the coil spring 40 and the first tube 11 during extension and compression of the first tube 11 and the second tube 61, a guide (not shown) for preventing the deflection of the coil spring 40 is arranged around the small diameter portion 23.

In the suspension apparatus 80 in the fourth embodiment, without the restriction by the coil spring 40, the size of the inner diameter of the cylinder 20 (large diameter portion 21) in the movable region of the piston 30 can be set. Accordingly, the operation and the advantage similar to those of the suspension apparatus 10 described in the first embodiment can be realized.

In the above, the present disclosure has been described, based on the embodiments, however, the disclosure is not limited at all by the above-described embodiments, and it is easily understood that various changes and modifications can be made in a range without departing from the spirit of the disclosure. For example, in the above embodiments, suspension apparatuses 10, 50, 60, and 80 without a built-in damper (damping force generator) have been described, however, without being limited thereto, it is of course possible to provide the built-in damper in the suspension apparatuses 10, 50, 60, and 80. In this case, a pair of suspension apparatuses 10, 50, 60 and 80 is attached to both sides of the wheel (not shown).

In the description of the above-described embodiments, the first tube 11 is disposed on the vehicle body side, and the second tube 12 or 61 is disposed on the wheel side, however, without being limited thereto, it is of course possible to dispose the first tube 11 on the wheel side and the second tube 12 or 61 on the vehicle body side.

In the description of the first, second, and fourth embodiments, the spring receiving member 41 is fixed to the small diameter portion 23, being in contact with the step portion 22, however, the disclosure is not necessarily limited thereto. For example, it is of course possible to provide a flange shaped member at a portion other than the step portion 22 of the small diameter portion 23 to fix the spring receiving member 41 to the member.

In the description of the first, second, and fourth embodiments, the small diameter portion 23 arranged for the cylinder 20 has a cylindrical shape, however, the disclosure is not necessarily limited thereto. As the small diameter portion 23 is a part for forming the step portion 22 where the spring receiving member 41 is disposed (in the first and second embodiments) and fixing the balance spring receiving member (which also serves as the rod guide 24 in the above-described embodiments), a shape of the small diameter portion 23 may be not the cylindrical shape. For example, it is of course possible to make the small diameter portion 23 in an angular tube shape with a cross-section of a quadrilateral or the like. Further, it is of course possible to axially symmetrically fix ends of two or more rod members, which extend in the axial direction, to radially inward portions of the step portion 22, and fix an annular balance spring receiving member to the rod members such as to be perpendicular to the rod members to take the place of the small diameter portion 23. This is done because it is possible to dispose the balance spring 43 on the balance spring receiving member, and house the balance spring 43 inside the rod members. In this case, as there is a gap between rod members, it is unnecessary to form a communication hole 26 communicating with the second gas chamber 36.

In the description of the first, second, and fourth embodiments, the balance spring 43 is arranged between the rod guide 24 and the stopper 34, however, the disclosure is not limited thereto. It is of course possible to omit the stopper 34, and dispose the balance spring 43 between the rod guide 24 and the piston 30. Further, instead of the rod guide 24, it is of course possible to provide a spring receiving member on the small diameter portion 23 and dispose the balance spring 43 between this spring receiving member and the stopper 34 or the piston 30.

In the description of the first, the third and the fourth embodiments, the expansion chamber 33 is formed over the entire length of the rod 32 (the expansion chamber 33 penetrating through the rod 32), however, the disclosure is not necessarily limited thereto. As the volume of the first gas chamber 35 can be enlarged by the volume of the expansion chamber 33 communicating with the first gas chamber 35, the expansion chamber 33 needs to be formed at least at a part of the rod 32.

In the description of the second embodiment, the wheel side bracket 13 is provided with the communication passage 51, and the sub-tank 52 communicating with the communication passage 51 is attached to the wheel side bracket 13, however, the disclosure is not necessarily limited thereto. Separately from the wheel side bracket 13, it is of course possible to provide a closing member for closing the bottom portion of the second tube 12, arrange the communication passage 51 at the closing member, and attach the sub-tank 52 communicating with the communication passage 51 to the wheel side bracket 13 or the closing member.

In the description of the first to fourth embodiments, the spring receiving member (not shown) arranged at the lower portion of the second tube 12, 61 supports the lower end of the coil spring 40, however, without being limited thereto, it is of course possible to omit the spring receiving member and make the wheel side bracket 13 (closing member) support the coil spring 40. Further, in the third embodiment, instead of the spring receiving member (not shown) provided at the lower portion of the second tube 61, it is of course possible to provide a spring receiving member at the lower portion of the rod 32 so that the spring receiving member supports the lower end of the coil spring 40. In any case, the coil spring 40 is arranged between the spring receiving member 41, 81 or the rod guide 66 (spring receiving member) and the wheel side bracket 13.

Incidentally, the above-described each embodiment may be changed or modified by adding a part or plural parts of structure in another embodiment to each embodiment, or, for instance, by replacing a part or plural parts of structure in another embodiment with a part or plural parts of each embodiment. For example, it is of course possible to omit the spring receiving member 41 described in the first and second embodiments or the spring receiving member 81 in the fourth embodiment, and use the step portion 22 as a spring receiving member (use a part (the rod guide 66) of the cylinder 65 as in the third embodiment as a spring receiving member)). Further, it is of course possible to make the cylinder 65 described in the third embodiment provided with the small diameter portion 23 described in the first embodiment, and make the small diameter portion 23 provided with the balance spring 43.

REFERENCE SINGS LIST

10, 50, 60, 80 Suspension apparatus
11 First tube
12, 61 Second tube
13 Wheel side bracket (closing member)
20, 65 Cylinder
21 Large diameter portion
22 Step portion
23 Small diameter portion
24 Rod guide (balance spring receiving member)
30 Piston
32 Rod
33 Expansion chamber
34 Stopper
35, 70 First gas chamber
36, 71 Second gas chamber
40 Coil spring
41, 81 Spring receiving member
43 Balance spring
44 Rebound spring
51 Communication passage
52 Sub-tank
66 Rod guide (spring receiving member)

What is claimed is:
1. A suspension apparatus, comprising:
a first tube and a second tube that are telescopic and that are disposed on a vehicle body side and on a wheel side, respectively;
a cylinder that is provided in the first tube;
a rod that is provided in the second tube;
a piston that is provided on the rod, slidingly contacts with an inner circumferential surface of the cylinder, and forms a first gas chamber on a side of the first tube;
a coil spring configured to urge the first tube and the second tube in an extension direction; and
a spring receiving member that is disposed at a position on a second tube side from a movable region of the piston, the coil spring being disposed between the spring receiving member and the second tube, wherein
the cylinder comprises:
a large diameter portion with which the piston slidingly contacts; and
a small diameter portion that is continuous, through a step portion, from the large diameter portion toward the second tube side,
the small diameter portion has an outer diameter smaller than an outer diameter of the large diameter portion, and
the spring receiving member is arranged at the step portion.
2. The suspension apparatus according to claim 1, wherein the small diameter portion communicates with a second gas chamber enclosed by the first tube and the second tube.

3. The suspension apparatus according to claim 2, comprising:
a balance spring receiving member that extends inward in a radial direction from the small diameter portion;
a stopper that is fixed on an outer circumference of the rod at a position on a piston side from the balance spring receiving member; and
a balance spring configured to urge the first tube and the second tube in a compression direction, wherein
the balance spring is disposed between the balance spring receiving member and the stopper.

4. The suspension apparatus according to claim 2, comprising:
a rebound spring that causes a reaction force at a maximum extension of the first tube and the second tube, wherein
the rebound spring is disposed between the piston and the step portion.

5. The suspension apparatus according to claim 1, comprising:
an expansion chamber that is formed along an axial direction inside the rod, wherein
the expansion chamber communicates with the first gas chamber.

6. The suspension apparatus according to claim 5, comprising:
a sub-tank that is provided at a closing member that closes a bottom portion of the second tube; and
a communication passage that is provided at the closing member and communicates with the sub-tank, wherein
the expansion chamber penetrates through the rod in the axial direction, and
the communication passage communicates with the expansion chamber.

* * * * *